United States Patent
Ando et al.

(10) Patent No.: US 7,788,023 B2
(45) Date of Patent: Aug. 31, 2010

(54) POWER OUTPUT APPARATUS, VEHICLE EQUIPPED WITH POWER OUTPUT APPARATUS, AND CONTROL METHOD OF POWER OUTPUT APPARATUS

(75) Inventors: Daigo Ando, Nisshin (JP); Fumikazu Satou, Toyota (JP); Takeshi Kanayama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 408 days.

(21) Appl. No.: 11/991,264

(22) PCT Filed: Dec. 19, 2006

(86) PCT No.: PCT/JP2006/325229

§ 371 (c)(1),
(2), (4) Date: Feb. 29, 2008

(87) PCT Pub. No.: WO2007/072798

PCT Pub. Date: Jun. 28, 2007

(65) Prior Publication Data

US 2009/0256513 A1    Oct. 15, 2009

(30) Foreign Application Priority Data

Dec. 19, 2005    (JP)    .............................. 2005-365434

(51) Int. Cl.
*G06F 19/00* (2006.01)
*G06G 7/70* (2006.01)
*F02N 11/06* (2006.01)
*F02N 11/04* (2006.01)
*F02N 11/08* (2006.01)

(52) U.S. Cl. ................. 701/112; 123/179.3; 123/179.4; 123/192.1; 318/478; 903/930

(58) Field of Classification Search ............... 123/179.3, 123/179.4, 192.1; 701/103, 112; 903/930, 903/904, 906, 907, 909, 910; 318/478; 180/65.26, 180/65.265, 65.27, 65.275, 65.28, 65.285
See application file for complete search history.

(56) References Cited

U.S. PATENT DOCUMENTS 4,699,097 A * 10/1987 Tanaka et al. ............ 123/192.1

(Continued)

FOREIGN PATENT DOCUMENTS

JP    A-2000-023310    1/2000

(Continued)

*Primary Examiner*—Stephen K Cronin
*Assistant Examiner*—Raza Najmuddin
(74) *Attorney, Agent, or Firm*—Oliff & Berridge, PLC

(57) ABSTRACT

A hybrid electronic control unit sends a combustion start command to an engine ECU when the rotation speed of an engine reaches a combustion start rotation speed by engine cranking. The engine ECU sends an initial explosion advance notification to the hybrid electronic control unit when the crank position of the engine reaches a specific position prior to an ignition timing of an initial explosion cylinder by a preset crank angle θec. Ignition of the initial explosion cylinder is performed at a timing when the crank position is further rotated by the preset crank angle θec. The hybrid electronic control unit sends a torque command in view of a counter torque Tα to a motor ECU after elapse of a preset time period tv. The preset time period tv is the sum of a first time period t1 between reception of the initial explosion advance notification and the ignition timing of the initial explosion cylinder in the engine and a second time period t2 between the ignition timing of the initial explosion cylinder in the engine and appearance of torque effect caused by the ignition of the initial explosion cylinder on a driveshaft. Such control timely reduces the torque effect caused by the initial explosion of the engine on the driveshaft.

7 Claims, 10 Drawing Sheets

U.S. PATENT DOCUMENTS

| | | | |
|---|---|---|---|
| 5,185,543 A * | 2/1993 | Tebbe | 310/51 |
| 5,537,967 A * | 7/1996 | Tashiro et al. | 123/192.1 |
| 6,083,139 A * | 7/2000 | Deguchi et al. | 477/5 |
| 6,176,808 B1 * | 1/2001 | Brown et al. | 477/5 |
| 6,315,068 B1 * | 11/2001 | Hoshiya et al. | 180/65.25 |

FOREIGN PATENT DOCUMENTS

| | | |
|---|---|---|
| JP | A-2000-078705 | 3/2000 |
| JP | 2002135908 * | 5/2002 |
| JP | A-2005-016442 | 1/2005 |
| JP | A-2005-030281 | 2/2005 |
| JP | A-2005-090307 | 4/2005 |
| JP | A-2005-184999 | 7/2005 |

* cited by examiner

POWER OUTPUT APPARATUS, VEHICLE EQUIPPED WITH POWER OUTPUT APPARATUS, AND CONTROL METHOD OF POWER OUTPUT APPARATUS

TECHNICAL FIELD

The present invention relates to a power output apparatus, a vehicle equipped with the power output apparatus, and a control method of the power output apparatus.

BACKGROUND ART

A typical proposed structure of a power output apparatus has an engine, a planetary gear mechanism having a carrier connected to a crankshaft of the engine and a ring gear connected to a driveshaft mechanically linked with an axle of a vehicle, a generator inputting and outputting power from and to a sun gear of the planetary gear mechanism, and a motor inputting and outputting power from and to the driveshaft. For example, in one proposed structure of the power output apparatus disclosed in Patent Document 1, when the crank angle of the engine is in a certain crank angle range between a preset angle θ1 and another preset angle θ2, a specific torque in a direction of canceling out a torque applied to a ring gear shaft or the driveshaft at an initial explosion of the engine is set to a correction torque. The certain crank angle range includes both a timing of torque output from the engine in the case of the initial explosion at a first ignition timing after start of fuel injection control and ignition control and a timing of torque output from the engine in the case of the initial explosion at a next ignition timing. A torque command of the motor is determined in view of the preset correction torque, and the operation of the motor is controlled to satisfy the predetermined torque command. This aims to reduce a potential torque shock and a torque shock-induced vibration at the initial explosion of the engine.

Patent Document 1: Japanese Patent Laid-Open Gazette No. 2005-30281

DISCLOSURE OF THE INVENTION

The proposed power output apparatus has, to some extent, the advantage of reducing the potential torque shock and the torque shock-induced vibration at the initial explosion of the engine. The timing of outputting the correction torque from the motor is, however, not synchronized with the timing of the initial explosion of the engine. The advantage of the torque shock reduction may thus be rather insufficient.

In the power output apparatus of the invention, the vehicle equipped with the power output apparatus, and the control method of the power output apparatus, it would be desirable to sufficiently reduce a potential torque shock at an initial explosion for a start of an internal combustion engine in the state of power output from a motor to a driveshaft.

The present invention accomplishes the requirement mentioned above by the following configurations applied to the power output apparatus, the vehicle equipped with the power output apparatus, and the control method of the power output apparatus.

One aspect of the invention pertains to a power output apparatus that outputs power to a driveshaft. The power output apparatus includes: an internal combustion engine; an electric power-mechanical power input output structure that is connected to an output shaft of the internal combustion engine and to the driveshaft and outputs at least part of output power of the internal combustion engine to the driveshaft through input and output of electric power and mechanical power; a motor that inputs and outputs power to and from the driveshaft; an accumulator unit that transmits electric power from and to the electric power-mechanical power input output structure and the motor; a torque demand setting module that sets a torque demand required for the driveshaft in response to an operator's operation; an internal combustion engine control module that controls operation of the internal combustion engine; and a total control module. Upon satisfaction of a start condition of the internal combustion engine in an operation stop state of the internal combustion engine during the operation control of the motor to output the torque demand, the total control module drives and controls the electric power-mechanical power input output structure to crank the internal combustion engine, while driving and controlling the motor to cancel out a torque applied to the driveshaft as a reactive force accompanied with cranking of the internal combustion engine and to ensure output of the torque demand. When a state of the internal combustion engine reaches a specified combustion start timing by cranking, the total control module sends a start command to the internal combustion control module. In response to reception of a synchronizing signal that is sent by the internal combustion engine control module at a specific timing prior to an initial explosion ignition timing by a preset value of a specific time relevant parameter after transmission of the start command, the total control module drives and controls the motor to output a specific torque that is smaller by a preset torque than a torque demand to be output from the motor when a certain time period corresponding to an equivalent value of the specific time relevant parameter has elapsed since reception of the synchronizing signal.

The power output apparatus according to this aspect of the invention has, as the control means, both the internal combustion engine control module for controlling the operations of the internal combustion engine and the total control module for controlling the operations of the electric power-mechanical power input output structure and the motor. When the start condition of the internal combustion engine is satisfied during the operation control of the motor to output the torque demand set in response to the operator's operation to the driveshaft in the operation stop state of the internal combustion engine, the total control module controls the operations of the electric power-mechanical power input output structure to crank the internal combustion engine, while controlling the operations of the motor to cancel out the torque applied to the driveshaft as the reactive force accompanied with cranking of the internal combustion engine and to ensure output of the torque demand to the driveshaft. The total control module sends the start command to the internal combustion control module when the state of the internal combustion engine reaches the specified combustion start timing by such cranking. In response to reception of the synchronizing signal sent by the internal combustion engine control module at the specific timing prior to the initial explosion ignition timing by the preset value of the specific time relevant parameter after transmission of the start command, the total control module controls the operations of the motor to output the specific torque that is smaller by the preset torque than the torque demand to be output from the motor at the timing when the certain time period corresponding to the equivalent value of the specific time relevant parameter has elapsed since reception of the synchronizing signal. In the power output apparatus of this arrangement, the internal combustion engine control module and the total control module are synchronized by transmission of the synchronizing signal. At the initial explosion of the internal combustion engine driven and controlled by the internal combustion engine control module, the motor driven and controlled by the total control module timely generates the preset torque to cancel out the torque applied to the drive shaft. This arrangement sufficiently reduces a potential torque shock at the initial explosion of the internal combustion engine.

In one preferable embodiment of the power output apparatus according to the above aspect of the invention, the equivalent value of the specific time relevant parameter may be set either to the preset value of the specific time relevant parameter or to the preset value in view of at least a communication delay between the internal combustion engine control module and the total control module. This arrangement further enhances the accuracy of the timing of generating the preset torque to cancel out the torque applied to the driveshaft.

In one preferable example of the power output apparatus, the specific time relevant parameter is a crank angle of the internal combustion engine that varies with elapse of time. The ignition timing of the internal combustion engine is generally determined according to the crank angle. It is hence desirable to determine the specific timing prior to the initial explosion ignition timing, based on the crank angle. In the application of utilizing the crank angle for the specific time relevant parameter, it is desirable to construct both the internal combustion engine control module and the total control module in such a manner as to enable direct input of the crank angle of the internal combustion engine. Such design desirably prevents failed synchronization due to a potential communication delay, compared with the structure of transmitting data on the crank angle from one control module to the other control module.

In one preferable embodiment of the power output apparatus according to the above aspect of the invention, the electric power-mechanical power input output structure has: a three shaft-type power input output mechanism that is linked to three shafts, the output shaft of the internal combustion engine, the driveshaft, and a third shaft, and inputs and outputs power from and to a residual one shaft based on powers input from and output to any two shafts among the three shafts; and a generator that inputs and outputs power from and to the third shaft.

Another aspect of the invention pertains to a vehicle equipped with the power output apparatus that has any of the arrangements described above and basically outputs power to a driveshaft. The power output apparatus mounted on the vehicle includes: an internal combustion engine; an electric power-mechanical power input output structure that is connected to an output shaft of the internal combustion engine and to the driveshaft and outputs at least part of output power of the internal combustion engine to the driveshaft through input and output of electric power and mechanical power; a motor that inputs and outputs power to and from the driveshaft; an accumulator unit that transmits electric power from and to the electric power-mechanical power input output structure and the motor; a torque demand setting module that sets a torque demand required for the driveshaft in response to an operator's operation; an internal combustion engine control module that controls operation of the internal combustion engine; and a total control module. Upon satisfaction of a start condition of the internal combustion engine in an operation stop state of the internal combustion engine during the operation control of the motor to output the torque demand, the total control module drives and controls the electric power-mechanical power input output structure to crank the internal combustion engine, while driving and controlling the motor to cancel out a torque applied to the driveshaft as a reactive force accompanied with cranking of the internal combustion engine and ensure output of the torque demand to the driveshaft. When a state of the internal combustion engine reaches a specified combustion start timing by cranking, the total control module sends a start command to the internal combustion control module. In response to reception of a synchronizing signal that is sent by the internal combustion engine control module at a specific timing prior to an initial explosion ignition timing by a preset value of a specific time relevant parameter after transmission of the start command, the total control module drives and controls the motor to output a specific torque that is smaller by a preset torque than a torque demand to be output from the motor when a certain time period corresponding to an equivalent value of the specific time relevant parameter has elapsed since reception of the synchronizing signal. The vehicle is driven with its axle mechanically linked to the driveshaft.

This vehicle is equipped with the power output apparatus having any of the applications described above. The vehicle according to this aspect of the invention thus possesses the advantages similar to those of the power output apparatus, for example, the advantage of sufficiently reducing the potential torque shock at the initial explosion of the internal combustion engine.

Still another aspect of the invention is directed to a control method of a power output apparatus. The power output apparatus has: an internal combustion engine; an electric power-mechanical power input output structure that is connected to an output shaft of the internal combustion engine and to a driveshaft and outputs at least part of output power of the internal combustion engine to the driveshaft through input and output of electric power and mechanical power; a motor that inputs and outputs power to and from the driveshaft; an accumulator unit that transmits electric power from and to the electric power-mechanical power input output structure and the motor; a torque demand setting module that sets a torque demand required for the driveshaft in response to an operator's operation; and an internal combustion engine control module that controls operation of the internal combustion engine. The control method of a power output apparatus includes:

(a) upon satisfaction of a start condition of the internal combustion engine in an operation stop state of the internal combustion engine, driving and controlling the electric power-mechanical power input output structure to crank the internal combustion engine, while driving and controlling the motor to cancel out a torque applied to the driveshaft as a reactive force accompanied with cranking of the internal combustion engine, (b) when a state of the internal combustion engine reaches a specified combustion start timing by cranking, sending a start command to the internal combustion control module, and (c) in response to reception of a synchronizing signal that is sent by the internal combustion engine control module at a specific timing prior to an initial explosion ignition timing by a preset value of a specific time relevant parameter after transmission of the start command, driving and controlling the motor to output a specific torque that is smaller by a preset torque than a torque demand to be output from the motor when a certain time period corresponding to an equivalent value of the specific time relevant parameter has elapsed since reception of the synchronizing signal.

In this aspect of the invention, when the start condition of the internal combustion engine is satisfied in the operation stop state of the internal combustion engine, the control method for the power output apparatus controls the operations of the electric power-mechanical power input output structure to crank the internal combustion engine, while controlling the operations of the motor to cancel out the torque applied to the driveshaft as the reactive force accompanied with cranking of the internal combustion engine. The control method sends the start command to the internal combustion control module when the state of the internal combustion engine reaches the specified combustion start timing by such cranking. In response to reception of the synchronizing signal sent by the internal combustion engine control module at the specific timing prior to the initial explosion ignition timing by the preset value of the specific time relevant parameter after transmission of the start command, the control method controls the operations of the motor to output the specific torque that is smaller by the preset torque than the torque demand to be output from the motor at the timing when the certain time period corresponding to the equivalent value of the specific time relevant parameter has elapsed since reception of the synchronizing signal. In synchronism with the synchronizing signal sent from the internal combustion engine control module, at the initial explosion of the internal combustion engine driven and controlled by the internal combustion engine control module, the control method controls the motor to timely generate the preset torque and cancel out the torque applied to the drive shaft. This arrangement sufficiently reduces a potential torque shock at the initial explosion of the internal combustion engine. The control method for the power output apparatus may have additional steps or operations to actualize any of the various functions in the power output apparatus described above.

BEST MODES OF CARRYING OUT THE INVENTION

One mode of carrying out the invention is discussed below as a preferred embodiment with reference to the accompanied drawings.

Figure 1:
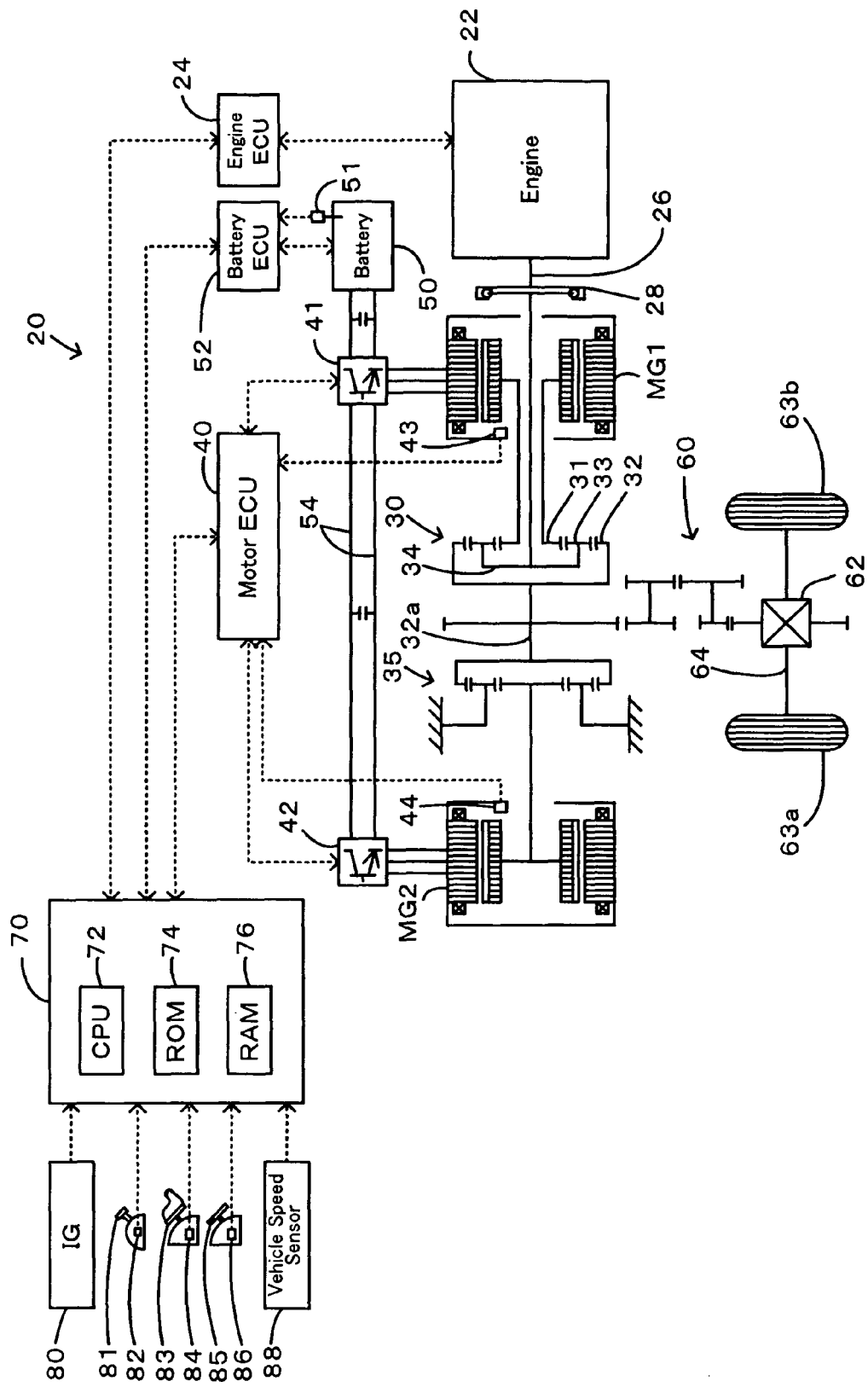
FIG. 1 schematically illustrates the configuration of a hybrid vehicle 20.

FIG. 1 schematically illustrates the configuration of a hybrid vehicle 20 equipped with a power output apparatus in one embodiment of the invention. As illustrated, the hybrid vehicle 20 of the embodiment includes an engine 22, a planetary gear mechanism 30 having a carrier 34 that rotates a pinion gear 33 and is linked to a crankshaft 26 or an output shaft of the engine 22 via a damper 28, a motor MG1 that is linked to a sun gear 31 of the planetary gear mechanism 30 and has power generation capability, a motor MG2 that is linked via a reduction gear 35 to a ring gear shaft 32a or a driveshaft connecting with a ring gear 32 of the planetary gear mechanism 30, and a hybrid electronic control unit 70 that functions as total control means for controlling the operations of the whole power output apparatus on the hybrid vehicle 20. The ring gear shaft 32a or the driveshaft is linked to an axle 64 provided with drive wheels 63a and 63b via a gear mechanism 60 and a differential gear 62. The output power to the ring gear shaft 32a is used as driving power of the hybrid vehicle 20.

Figure 2:
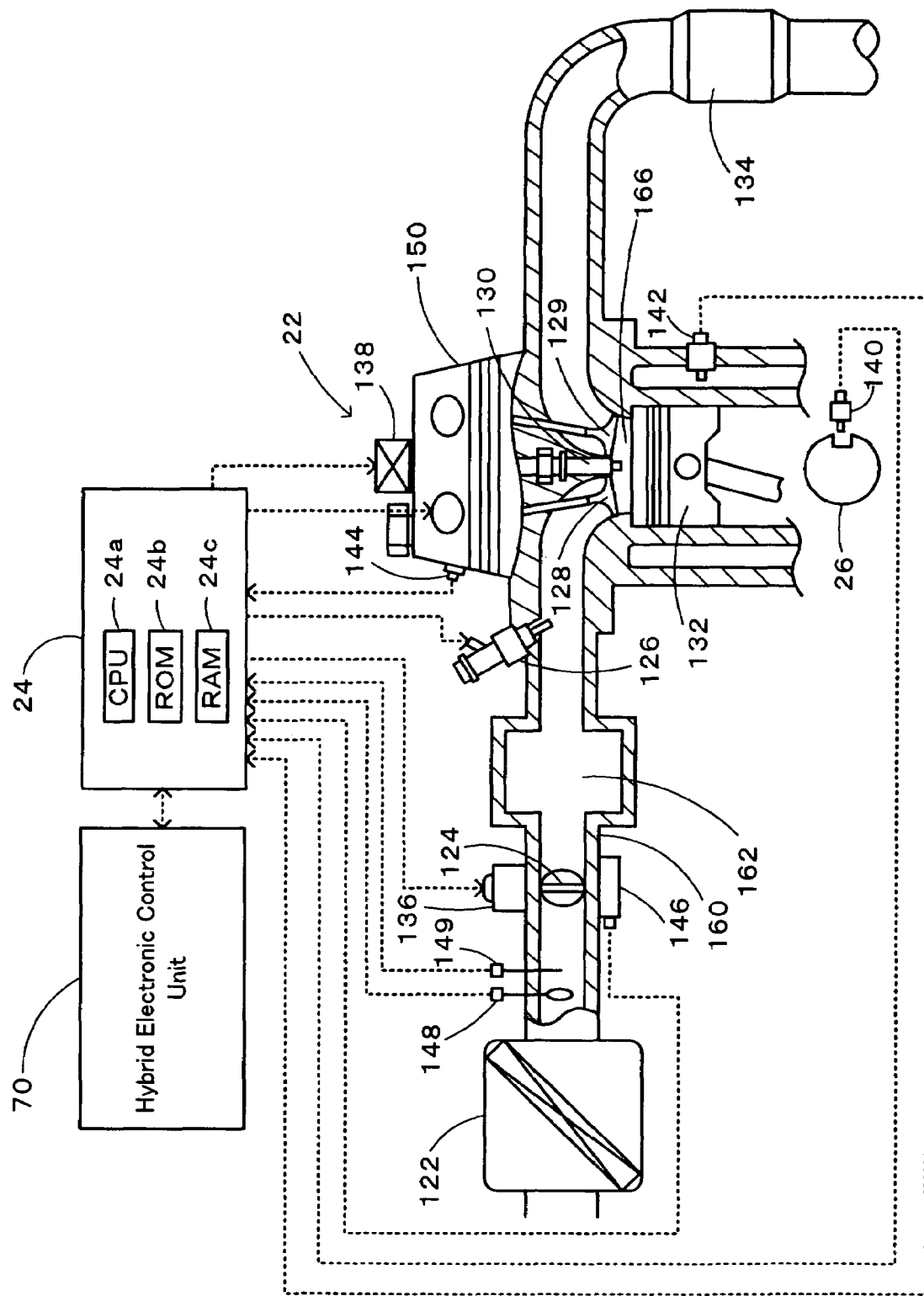
FIG. 2 schematically shows the structure of an engine 22 mounted on the hybrid vehicle 20.

The engine 22 is an internal combustion engine that consumes a hydrocarbon fuel, such as gasoline or light oil, to output power. As shown in FIG. 2, the air cleaned by an air cleaner 122 and taken into an air intake conduit 160 via a throttle valve 124 is mixed with the atomized fuel injected from a fuel injection valve 126 to the air-fuel mixture. The air-fuel mixture is introduced into a combustion chamber 166 by means of an intake valve 128. The introduced air-fuel mixture is ignited with spark made by a spark plug 130 to be explosively combusted. The reciprocating motions of a piston 132 pressed down by the combustion energy are converted into rotational motions of the crankshaft 26. The air flow is taken into the engine 22 via a surge tank 162 that is located in the middle of the air intake conduit 160 and has a sufficient volume for restricting the air intake pulsation. The exhaust from the engine 22 goes through a catalytic converter (three-way catalyst) 134 to convert toxic components included in the exhaust, that is, carbon monoxide (CO), hydrocarbons (HC), and nitrogen oxides (NOx), into harmless components, and is discharged to the outside air.

The engine 22 is under control of an engine electronic control unit (hereafter referred to as engine ECU) 24 that functions as internal combustion engine control means. The engine ECU 24 is constructed as a microprocessor including a CPU 24a, a ROM 24b that stores processing programs, a RAM 24c that temporarily stores data, input and output ports (not shown), and a communication port (not shown). The engine ECU 24 receives, via its input port, signals from various sensors that measure and detect the operating conditions of the engine 22. The signals input into the engine ECU 24 include a crank angle θe from a crank angle sensor 140 detected as the rotational position of the crankshaft 26, a cooling water temperature from a water temperature sensor 142 measured as the temperature of cooling water in the engine 22, a cam position from a cam position sensor 144 detected as the rotational position of a camshaft driven to open and close the intake valve 128 and an exhaust valve 129 for gas intake and exhaust into and from the combustion chamber 166, a throttle position from a throttle valve position sensor 146 detected as the position of the throttle valve 124, an air flow meter signal AF from an air flow meter 148 attached to the air intake conduit 160, and an intake air temperature from an intake air temperature sensor 149 attached to the air intake conduit 160. The engine ECU 24 outputs, via its output port, diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. The engine ECU 24 established communication with the hybrid electronic control unit 70 to drive and control the engine 22 in response to control signals received from the hybrid electronic control unit 70 and to output data regarding the operating conditions of the engine 22 to the hybrid electronic control unit 70 according to the requirements.

The motors MG1 and MG2 are constructed as known synchronous motor generators that may be actuated both as a generator and as a motor. The motors MG1 and MG2 transmit electric powers to and from a battery 50 via inverters 41 and 42. Both the motors MG1 and MG2 are driven and controlled by a motor electronic control unit (hereafter referred to as motor ECU) 40. The motor ECU 40 inputs signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 establishes communication with the hybrid electronic control unit 70 to drive and control the motors MG1 and MG2 in response to control signals received from the hybrid electronic control unit 70 and to output data regarding the operating conditions of the motors MG1 and MG2 to the hybrid electronic control unit 70 according to the requirements.

The battery 50 is under control and management of a battery electronic control unit (hereafter referred to as battery ECU) 52. The battery ECU 52 inputs signals required for management and control of the battery 50, for example, an inter-terminal voltage from a voltage sensor (not shown) located between terminals of the battery 50, a charge-discharge current from a current sensor (not shown) located in a power line 54 connecting with an output terminal of the battery 50, and a battery temperature Tb from a temperature sensor 51 attached to the battery 50. The battery ECU 52 computes a remaining charge level or current state of charge (SOC) of the battery 50 for the purpose of management of the battery 50, while calculating a charge-discharge power demand Pb* required to charge the battery 50 or to be discharged from the battery 50, based on the computed state of charge (SOC), the input battery temperature Tb, and input and output limits Win and Wout of the battery 50. The battery ECU 52 outputs these computation results and other data to the hybrid electronic control unit 70 by communication, according to the requirements.

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 88. The hybrid electronic control unit 70 establishes communication with the engine ECU 24, the motor ECU 40, and the battery ECU 52 via its communication port to receive and send the diversity of control signals and data from and to the engine ECU 24, the motor ECU 40, and the battery ECU 52 as mentioned above.

The hybrid vehicle 20 of the embodiment constructed as described above sets a torque demand to be output to the ring gear shaft 32a or the driveshaft, based on the vehicle speed V and the accelerator opening Acc (corresponding to the driver's depression amount of the accelerator pedal 83), and drives and controls the engine 22 and the motors MG1 and MG2 to ensure output of a power demand equivalent to the preset torque demand to the ring gear shaft 32a. There are several drive control modes of the engine 22 and the motors MG1 and MG2. In a torque conversion drive mode, while the engine 22 is driven and controlled to output a required level of power corresponding to the power demand, the motors MG1 and MG2 are driven and controlled to enable all the output power of the engine 22 to be subjected to torque conversion by means of the planetary gear mechanism 30 and the motors MG1 and MG2 and to be output to the ring gear shaft 32a. In a charge-discharge drive mode, the engine 22 is driven and controlled to output a required level of power corresponding to the sum of the power demand and electric power used to charge the battery 50 or discharged from the battery 50. The motors MG1 and MG2 are driven and controlled to enable all or part of the output power of the engine 22, which is equivalent to the power demand with charge or discharge of the battery 50, to be subjected to torque conversion by means of the planetary gear mechanism 30 and the motors MG1 and MG2 and to be output to the ring gear shaft 32a. In a motor drive mode, the motor MG2 is driven and controlled to ensure output of a required level of power corresponding to the power demand to the ring gear shaft 32a, while the engine 22 stops its operation.

Figure 3:
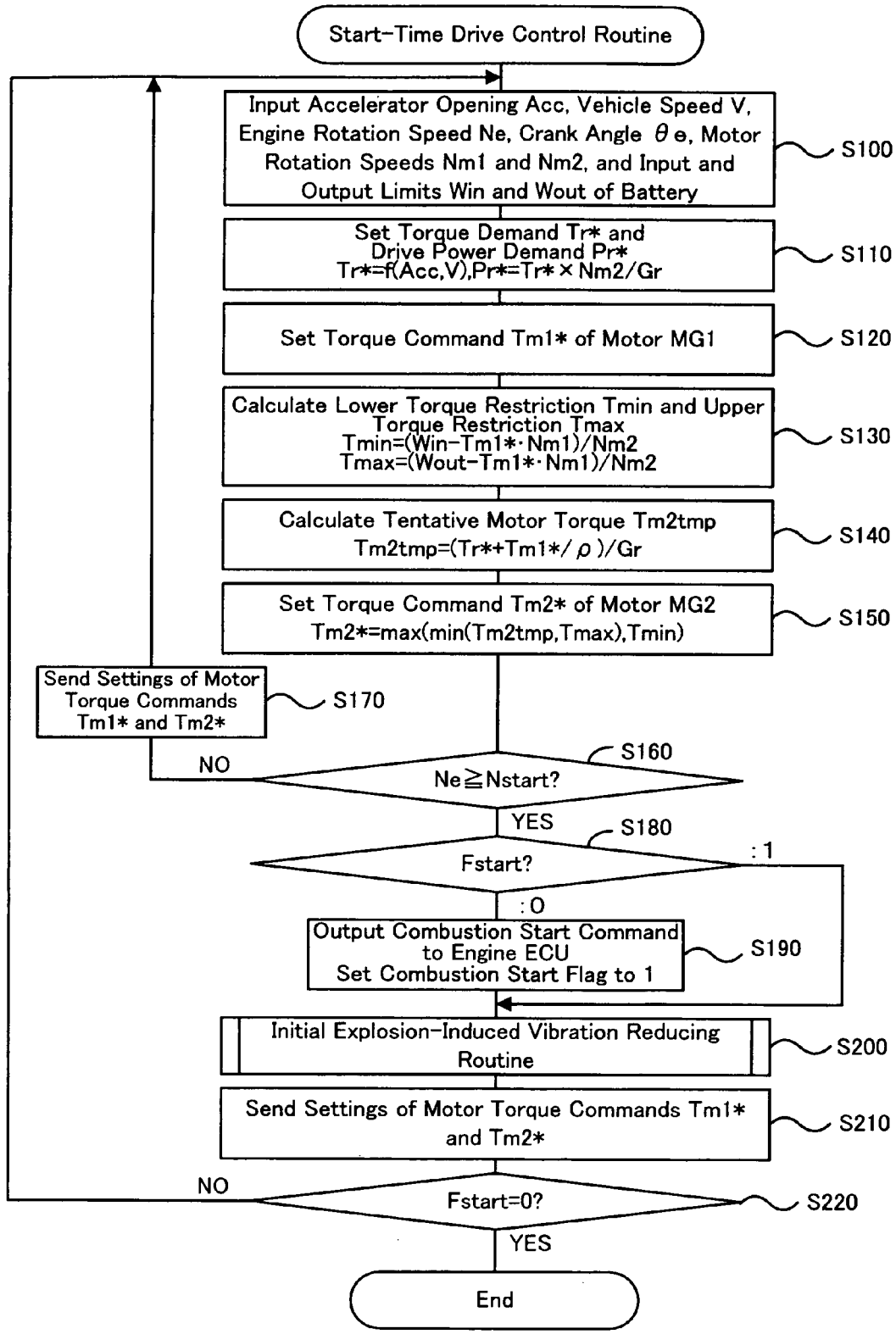
FIG. 3 is a flowchart showing a start-time drive control routine executed by a hybrid electronic control unit 70.

The description regards the operations of the hybrid vehicle 20 of the embodiment having the configuration discussed above, especially a series of processing to start the engine 22 from an operation stop state. FIG. 3 is a flowchart showing a start-time drive control routine executed by the hybrid electronic control unit 70. This drive control routine is performed in response to a start command of the engine 22. The start command of the engine 22 is given, for example, when the engine power demand required for the engine 22 exceeds a preset threshold value in the motor drive mode.

In the start-time drive control routine, the CPU 72 of the hybrid electronic control unit 70 first inputs various data required for control, that is, the accelerator opening Acc from the accelerator pedal position sensor 84, the vehicle speed V from the vehicle speed sensor 88, the crank angle $\theta e$ and a rotation speed Ne of the engine 22, rotation speeds Nm1 and Nm2 of the motors MG1 and MG2, and the input limit Win and output limit Wout of the battery 50 (step S100). The crank angle $\theta e$ of the engine 22 detected by the crank angle sensor 140 and the rotation speed Ne of the engine 22 computed from the detected crank angle $\theta e$ are received from the engine ECU 24 by communication. The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The input limit Win and the output limit Wout of the battery 50 are set based on the state of charge SOC of the battery 50 and are received from the battery ECU 52 by communication.

Figure 4:
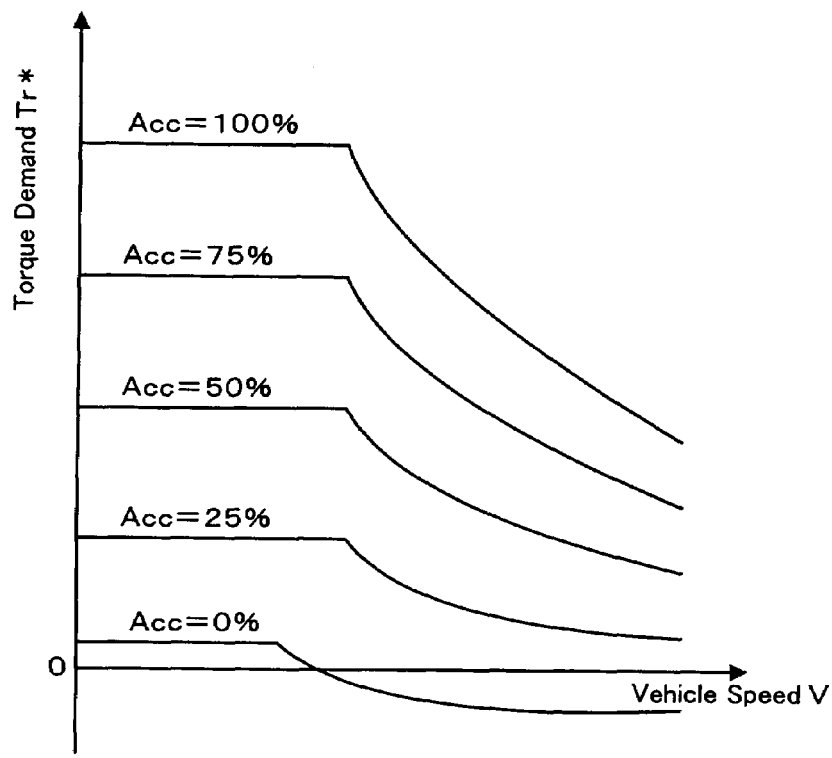
FIG. 4 shows one example of a torque demand setting map.

After the data input, the CPU 72 sets a torque demand Tr* to be output to the ring gear shaft 32a or the driveshaft linked to the drive wheels 63a and 63b as a torque required for the hybrid vehicle 20 and a drive power demand Pr* to be output as a driving power to the ring gear shaft 32a, based on the input accelerator opening Acc and the input vehicle speed V (step S110). A concrete procedure of setting the torque demand Tr* in this embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from this torque demand setting map. One example of the torque demand setting map is shown in FIG. 4. The drive power demand Pr* is calculated by multiplying the set torque demand Tr* by a rotation speed Nr of the ring gear shaft 32a. The rotation speed Nr of the ring gear shaft 32a is obtained by multiplying the vehicle speed V by a preset conversion factor k or by dividing the rotation speed Nm2 of the motor MG2 by a gear ratio Gr of the reduction gear 35.

Figure 5:
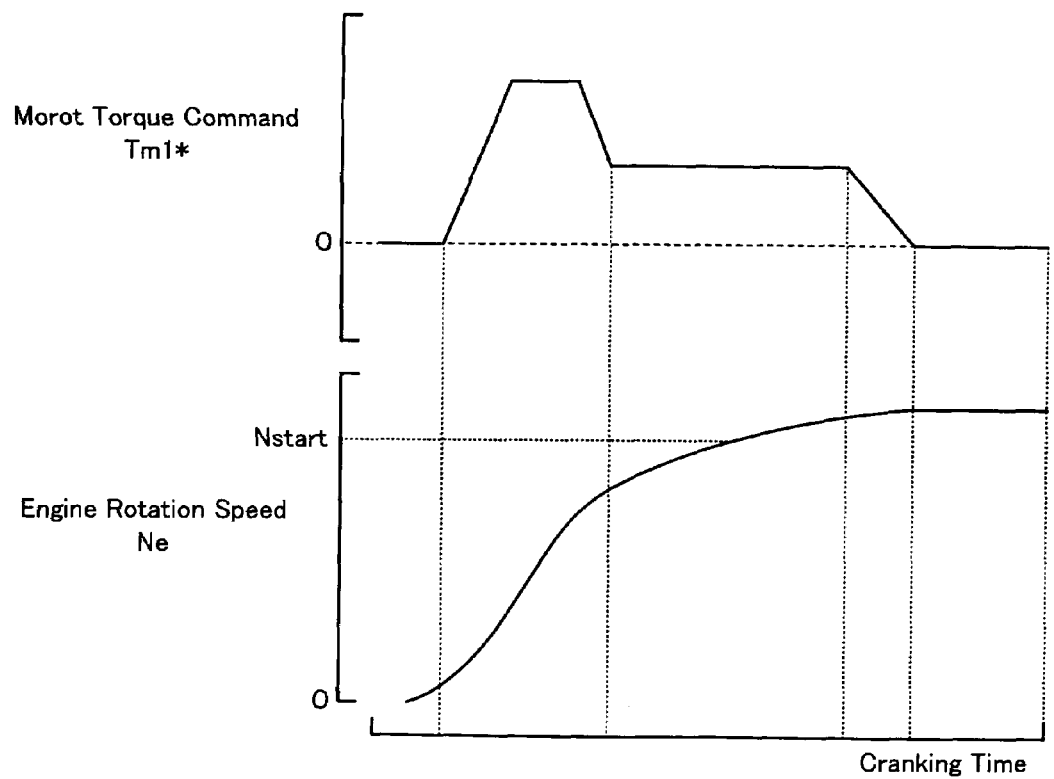
FIG. 5 is a graph showing variations in torque command Tm1* of a motor MG1 and rotation speed Ne of the engine 22 at a start of the engine 22.

The CPU 72 subsequently sets a torque command Tm1* of the motor MG1 (step S120). The torque command Tm1* is set to a specific torque level that enables the engine 22 to be stably driven at the rotation speed Ne of not lower than a predetermined combustion start rotation speed Nstart. More specifically, at the initial stage of cranking, the torque command Tm1* is set to a relatively large value to enable the rotation speed Ne of the engine 22 to quickly pass through a resonance frequency band. After the engine 22 has passed through the resonance frequency band, the torque command Tm1* is set to ensure the stable rotation of the engine 22 at the rotation speed Ne of or over the predetermined combustion start rotation speed Nstart. FIG. 5 is a graph showing variations in torque command Tm1* of the motor MG1 and rotation speed Ne of the engine 22 against the cranking time. The combustion start rotation speed Nstart may be set, for example, equal to 600 rpm or 800 rpm.

Figure 6:
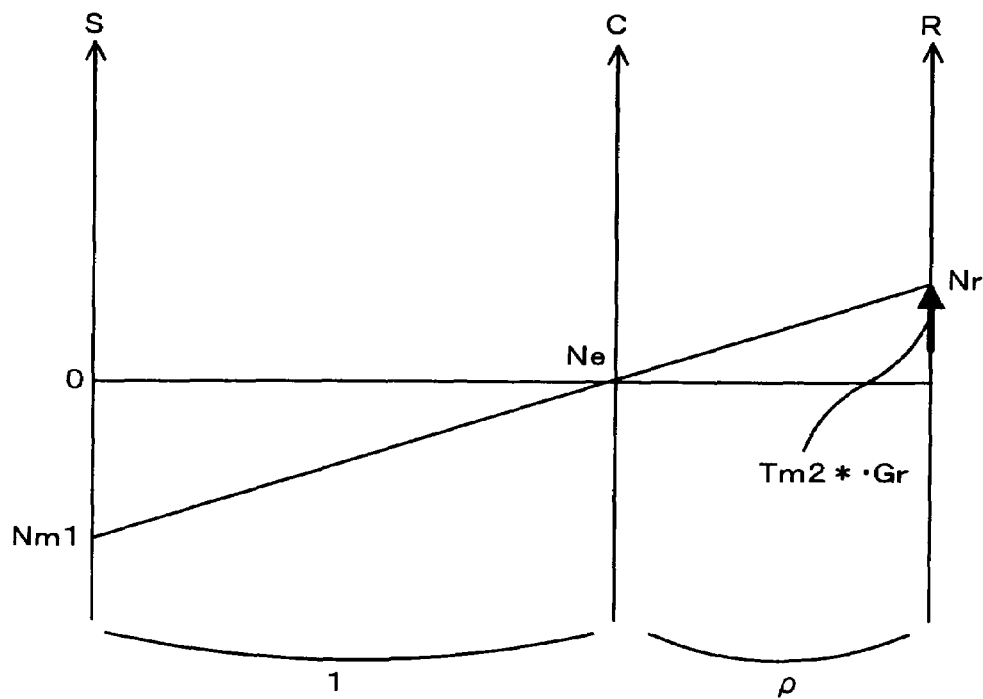
FIG. 6 is an alignment chart showing torque-rotation speed dynamics of rotational elements included in a planetary gear mechanism 30 prior to a start of the engine 22.
Figure 7:
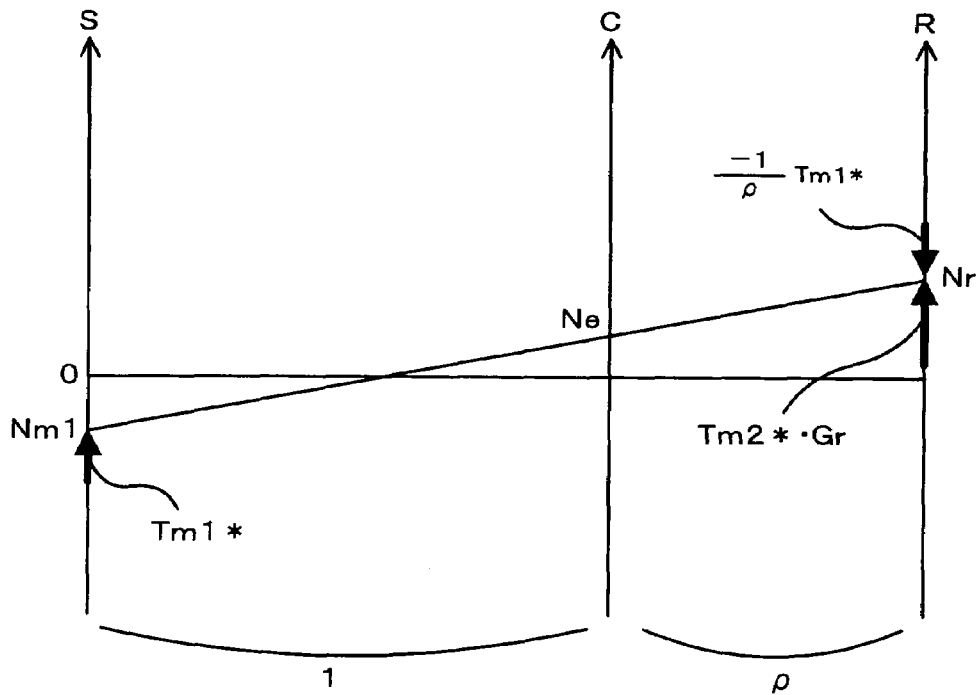
FIG. 7 is an alignment chart showing torque-rotation speed dynamics of the rotational elements included in the planetary gear mechanism 30 during cranking of the engine 22.

After setting the torque command Tm1* of the motor MG1, the CPU 72 calculates a lower torque restriction Tmin and an upper torque restriction Tmax as minimum and maximum torques that may be output from the motor MG2, according to Equations (1) and (2) given below (step S130). The lower torque restriction Tmin is given by dividing a difference between the input limit Win of the battery 50 and power consumption (power generation) of the motor MG1, which is the product of the torque command Tm1* and the input current rotation speed Nm1 of the motor MG1, by the input current rotation speed Nm2 of the motor MG2. Similarly the upper torque restriction Tmax is given by dividing a difference between the output limit Wout of the battery 50 and the power consumption (power generation) of the motor MG1 by the input current rotation speed Nm2 of the motor MG2. The CPU 72 then calculates a tentative motor torque Tm2tmp to be output from the motor MG2 from the torque demand Tr*, the torque command Tm1* of the motor MG1, and a gear ratio ρ of the planetary gear mechanism 30, according to Equation (3) given below (step S140). The CPU 72 limits the tentative motor torque Tm2tmp to the range between the calculated lower torque restriction Tmin and upper torque restriction Tmax to set a torque command Tm2* of the motor MG2 (step S150). It is then determined whether the rotation speed Ne of the engine 22 reaches or exceeds the predetermined combustion start rotation speed Nstart (step S160). Immediately after input of the start command of the engine 22, the rotation speed Ne of the engine 22 has not yet reached the predetermined combustion start rotation speed Nstart. The CPU 72 accordingly sends the settings of the torque commands Tm1* and Tm2* of the motors MG1 and MG2 to the motor ECU 40 (step S170) and returns to step S100. Setting the torque command Tm1* of the motor MG1 and the torque command Tm2* of the motor MG2 in this manner enables output of the torque demand Tr* to the ring gear shaft 32a or the driveshaft as the restricted torque within the range of the input limit Win and the output limit Wout of the battery 50, while cranking the engine 22. Equation (3) is a dynamic relational expression of rotational elements included in the planetary gear mechanism 30. FIG. 6 is an alignment chart showing torque-rotation speed dynamics of the rotational elements included in the planetary gear mechanism 30, prior to a start of the engine 22. FIG. 7 is an alignment chart showing torque-rotation speed dynamics of the rotational elements included in the planetary gear mechanism 30 during cranking of the engine 22. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 obtained by multiplying the rotation speed Nm2 of the motor MG2 by the gear ratio Gr of the reduction gear 35. Equation (3) is readily introduced from the alignment chart of FIG. 7. A downward thick arrow on the axis 'R' in FIG. 7 represents a torque (−Tm1*/ρ) as a reactive force applied to the ring gear shaft 32a or the driveshaft during cranking of the engine 22 with output of a torque equivalent to the torque command Tm1* from the motor MG1. An upward thick arrow on the axis 'R' represents a torque (Tm2*·Gr) applied to the ring gear shaft 32a via the reduction gear 35 when a torque equivalent to the torque command Tm2* is output from the motor MG2. Setting the torque command Tm2* of the motor MG2 in this manner accommodates the torque as the reactive force applied to the ring gear shaft 32a or the driveshaft during cranking of the engine 22 by means of the motor MG1, while ensuring output of a torque equivalent to the driver's required torque demand Tr*.

$$Tmin=(Win-Tm1^*\cdot Nm1)/Nm2 \quad (1)$$

$$Tmax=(Wout-Tm1^*\cdot Nm1)/Nm2 \quad (2)$$

$$Tm2tmp=(Tr^*+Tm1^*/\rho)/Gr \quad (3)$$

Through the repeated execution of steps S100 to S170, the rotation speed Ne of the engine 22 eventually reaches or exceeds the predetermined combustion start rotation speed Nstart. At this moment, it is identified whether a combustion start flag Fstart is set to 0 or 1 (step S180). The combustion start flag Fstart shows output or non-output of a combustion start command to the engine ECU 24. The combustion start flag Fstart set equal to 0 represents that the combustion start command has not yet been output to the engine ECU 24. The combustion start flag Fstart set equal to 1, on the other hand, represents that the combustion start command has already been output to the engine ECU 24. It is here assumed that the rotation speed Ne of the engine 22 has just reached the predetermined combustion start rotation speed Nstart at step S160. In this situation, the combustion start flag Fstart is identified as 0 at step S180. The CPU 72 accordingly outputs the combustion start command to the engine ECU 24 and sets the combustion start flag Fstart to 1 (step S190), and subsequently executes an initial explosion-induced vibration reducing routine as a subroutine (step S200).

Figure 8:
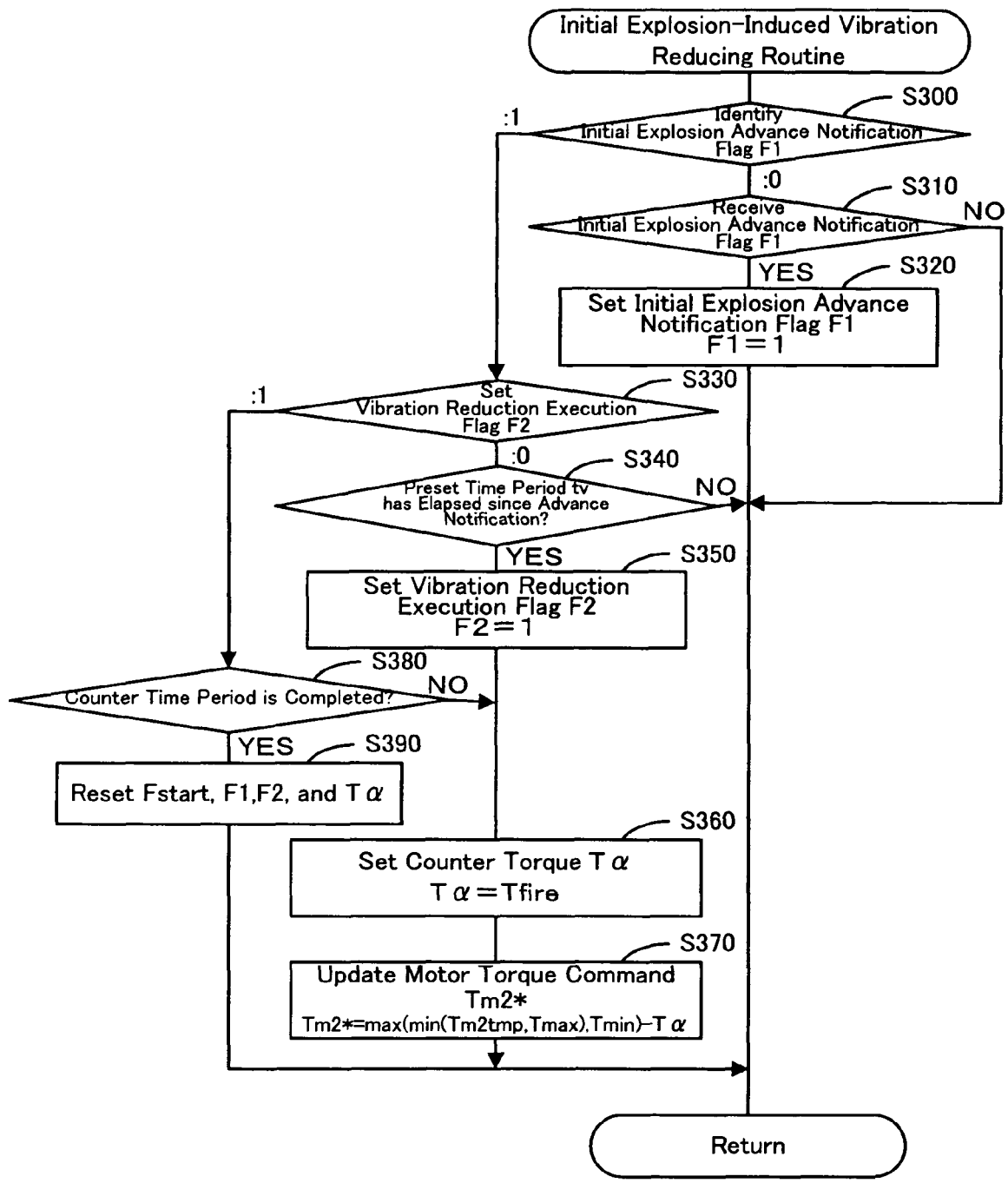
FIG. 8 is a flowchart showing an initial explosion-induced vibration reducing routine as a subroutine of the start-time drive control routine.

FIG. 8 is a flowchart showing the initial explosion-induced vibration reducing routine. On the start of the initial explosion-induced vibration reducing routine, the CPU 72 of the hybrid electronic control unit 70 identifies the value of an initial explosion advance notification flag F1 (step S300). The engine ECU 24 sends an initial explosion advance notification, when the crank position of the engine 22 reaches a predetermined initial explosion advance notification position, which is prior to an ignition timing of an initial explosion cylinder by a preset crank angle θec (for example, 180° or 200°). The initial explosion advance notification flag F1 is equal to 0 until reception of the initial explosion advance notification, and is set to 1 after reception of the initial explosion advance notification. In the first cycle of this initial explosion-induced vibration reducing routine, the initial explosion advance notification flag F1 is identified as 0. The CPU 72 accordingly determines whether the initial explosion advance notification is received from the engine ECU 24 (step S310). When the initial explosion advance notification has not yet been received from the engine ECU 24, the CPU 72 immediately terminates this initial explosion-induced vibration reducing routine. When the initial explosion advance notification is received from the engine ECU 24, the CPU 72 sets the initial explosion advance notification flag F1 to 1 (step S320) and terminates this initial explosion-induced vibration reducing routine. When the initial explosion advance notification flag F1 is identified as 1 at step S300, on the other hand, the CPU 72 subsequently identifies the value of a vibration reduction execution flag F2 (step S330). The vibration reduction execution flag F2 is equal to 0 until elapse of a preset time period tv (a time relevant parameter), and is set to 1 after elapse of the preset time period tv. The preset time period tv is the sum of a first time period t1 between reception of the initial explosion advance notification and the ignition timing of the initial explosion cylinder in the engine 22 and a second time period t2 between the ignition timing of the initial explosion cylinder in the engine 22 and appearance of torque effect caused by the ignition of the initial explosion cylinder on the ring gear shaft 32a. The first time period t1 is determined experimentally or otherwise as the time count to the ignition timing of the initial explosion cylinder in the engine 22 since reception of the initial explosion advance notification. The first time period t1 is shorter than a time period required for rotation of the preset crank angle θec since transmission of the initial explosion advance notification by the engine ECU 24 by a communication time delay between the engine ECU 24 and the hybrid electronic control unit 70. The second time period t2 is also experimentally or otherwise determined. When the vibration reduction execution flag F2 is identified as 0 at step S330, it is subsequently determined whether the preset time period tv has elapsed since the initial explosion advance notification (step S340). When the preset time period tv has not yet elapsed, the CPU 72 immediately terminates the initial explosion-induced vibration reducing routine. When the preset time period tv has elapsed, on the other hand, the CPU 72 sets the vibration reduction execution flag F2 to 1 (step S350), sets a counter torque Tα (step S360), and updates the torque command Tm2* to a result of subtraction of the counter torque Tα from the current torque command Tm2* (step S370) before terminating the initial explosion-induced vibration reducing routine.

On the initial explosion in the engine 22, there is abrupt power input and output into and from the carrier 34 of the planetary gear mechanism 30 connecting with the crankshaft 26 of the engine 22. In view of an inertial force based on the mass of the rotor in the motor MG1, there is a torque applied to the ring gear shaft 32a accompanied with the power input and output. The counter torque Tα is set to cancel out the torque applied to the ring gear shaft 32a and depends upon the initial explosion state of the engine 22. In the embodiment, the counter torque Tα is set, based on the various operation parameters of the engine 22, for example, the intake air temperature measured by the intake air temperature sensor 149, the gearshift position SP detected by the gearshift position sensor 82, and the cooling water temperature measured by the water temperature sensor 142. A concrete procedure of setting the counter torque Tα corresponding to these operation parameters experimentally or otherwise specifies variations in counter torque Tα against these operation parameters in various states in the form of a map to be stored in the ROM 74 and reads the counter torque Tα corresponding to the detected and measured operation parameters from the map. Another applicable procedure may specify rates of change in counter torque Tα relative to changes of the respective operation parameters as correction factors and multiplies a base torque value by the correction factors of the respective operation parameters to set the counter torque Tα. The magnitude of the counter torque Tα depends upon the properties of the engine 22 and the motor MG1.

When the vibration reduction execution flag F2 is identified as 1 at step S330, it is contemplated that the motor MG2 is driven and controlled with the updated torque command Tm2* in view of the counter torque Tα. In this case, the CPU 72 subsequently determines whether a counter time period is completed (step S380). In the counter time period, the CPU 72 goes to steps S360 and S370 to drive and control the motor MG2 with the updated torque command Tm2* in view of the counter torque Tα. On completion of the counter time period, the CPU 72 resets the combustion start flag Fstart, the flags F1 and F2, and the counter torque Tα (step S390) before terminating the initial explosion-induced vibration reducing routine.

Referring back to the flowchart of FIG. 3, on conclusion of the initial explosion-induced vibration reducing routine at step S200, the CPU 72 sends the settings of the torque command Tm1* and Tm2* to the motor ECU 40 (step S210) and identifies whether the combustion start flag Fstart is equal to 0 (step S220). When the combustion start flag Fstart is equal to 1, it is considered that the vibration reducing process at the initial explosion of the engine 22 is not concluded. The CPU 72 accordingly returns to step S100 and repeats the processing of steps S100 to S220. When the combustion start flag Fstart is equal to 0, on the other hand, it is considered that the vibration reducing process at the initial explosion of the engine 22 is concluded. The CPU 72 accordingly terminates the start-time drive control routine of FIG. 3. The motor ECU 40 receives the settings of the torque commands Tm1* and Tm2* and performs switching control of the switching elements included in the respective inverters 41 and 42 to drive the motor MG1 with the torque command Tm1* and the motor MG2 with the torque command Tm2*. In the case of setting the counter torque Tα in the initial explosion-induced vibration reducing routine, the torque command Tm2* of the motor MG2 is updated to the result of subtraction of the counter torque Tα from the current torque command Tm2*. The operation control of the motor MG2 with the updated torque command Tm2* desirably reduces the torque effect (including a torque shock and a torque shock-induced vibration) caused by the mass of the rotor in the motor MG1 at the initial explosion of the engine 22 on the ring gear shaft 32a. On completion of the start-time drive control routine shown in FIG. 3, a general drive control routine (not shown) is executed to drive the hybrid vehicle 20 in the torque conversion drive mode or in the charge discharge drive mode with the operations of the engine 22 and the motors MG1 and MG2. Such general drive control is not characteristic of the present invention and is thus not specifically described here.

Figure 9:
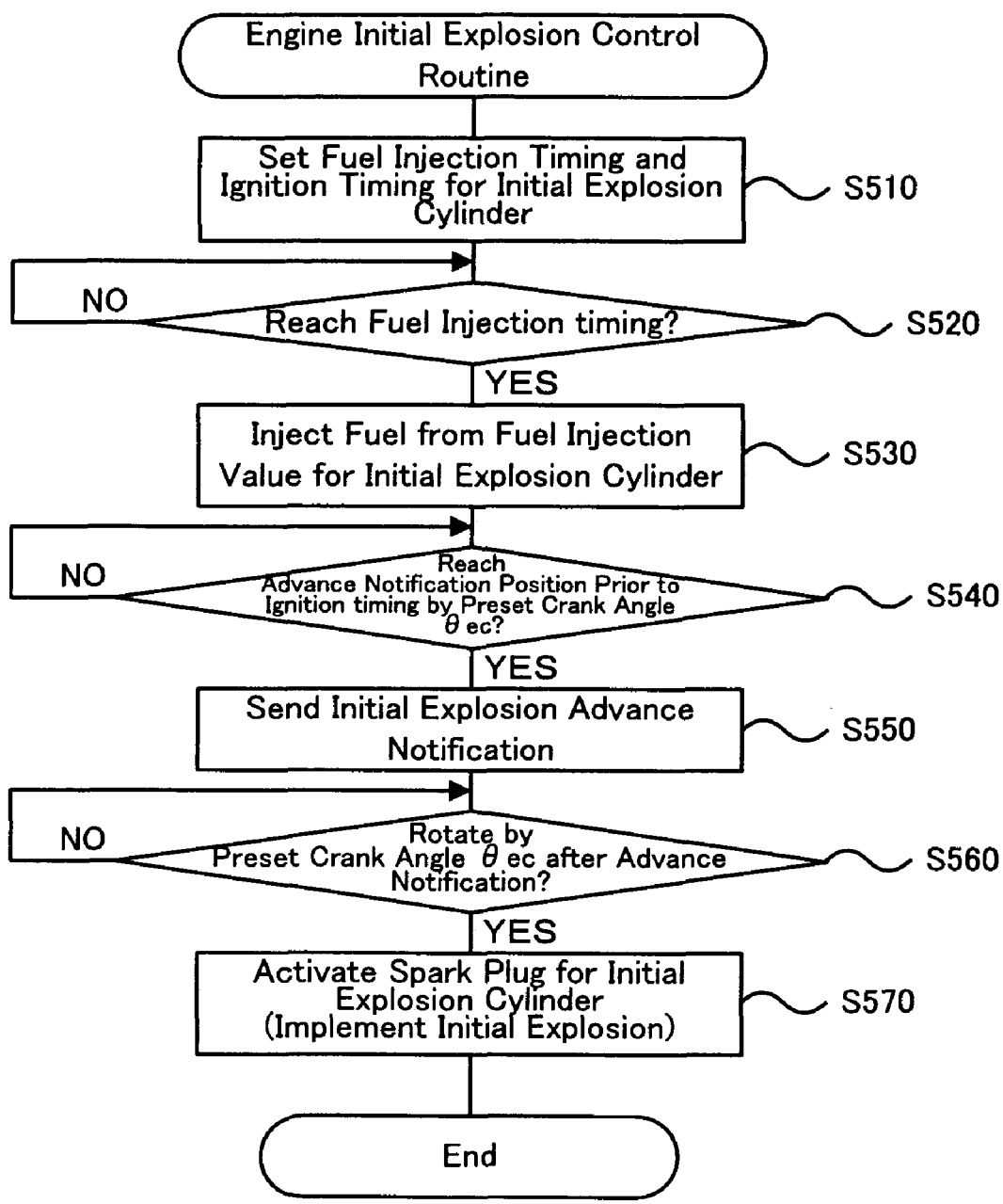
FIG. 9 is a flowchart showing an initial engine explosion control routine executed by an engine ECU 24.

The description now regards engine initial explosion control that is performed according to an engine initial explosion control routine shown in the flowchart of FIG. 9. This control routine is executed by the engine ECU 24 in response to reception of the combustion start command from the hybrid electronic control unit 70. On the start of the engine initial explosion control routine, the engine ECU 24 first specifies a cylinder having the earliest fuel injection timing as the initial explosion cylinder among the multiple cylinders and sets a fuel injection timing, a fuel injection amount, and an ignition timing for the specified initial explosion cylinder, based on the relevant data including the intake air temperature from the intake air temperature sensor 149 and the cooling water temperature from the water temperature sensor 142 (step S510). The engine ECU 24 subsequently determines whether the crank position of the engine 22 reaches the fuel injection timing of the initial explosion cylinder, based on the crank angle θe from the crank angle sensor 140 (step S520). The engine ECU 24 waits until the fuel injection timing of the initial explosion cylinder. When the crank position of the engine 22 reaches the fuel injection timing of the initial explosion cylinder, the fuel injection valve 126 for the initial explosion cylinder is controlled to inject the set fuel injection amount of fuel into the initial explosion cylinder (step S530). It is then determined whether the crank position of the engine 22 reaches the predetermined initial explosion advance notification position, which is prior to the ignition timing of the initial explosion cylinder by the preset crank angle θec, based on the crank angle θe from the crank angle sensor 140 (step S540). The engine ECU 24 waits until the predetermined initial explosion advance notification position. When the crank position of the engine 22 reaches the predetermined initial explosion advance notification position, the engine ECU 24 sends the initial explosion advance notification to the hybrid electronic control unit 70 (step S550). It is subsequently determined whether the crank position of the engine 22 is rotated by the preset crank angle θec after transmission of the initial explosion advance notification, based on the crank angle θe from the crank angle sensor 140 (step S560). The engine ECU 24 waits until rotation by the preset crank angle θec after transmission of the initial explosion advance notification. When the crank position of the engine 22 is rotated by the preset crank angle θec after transmission of the initial explosion advance notification, the engine ECU 24 gives power supply to the ignition coil 138 for the initial explosion cylinder and ignites the air-fuel mixture with the spark from the spark plug 130 (step S570), before terminating the engine initial explosion control routine. The air-fuel mixture is initially exploded and combusted to generate a torque in the initial explosion cylinder of the engine 22 at the timing when the crank angle of the engine 22 is rotated by the preset crank angle θec after transmission of the initial explosion advance notification. As mentioned previously, the torque generated at the initial explosion is applied to the ring gear shaft 32a. The torque effect (including the torque shock and the torque shock-induced vibration) is reduced by the torque Tm2 output from the motor MG2 corresponding to the torque command Tm2*.

Figure 10:
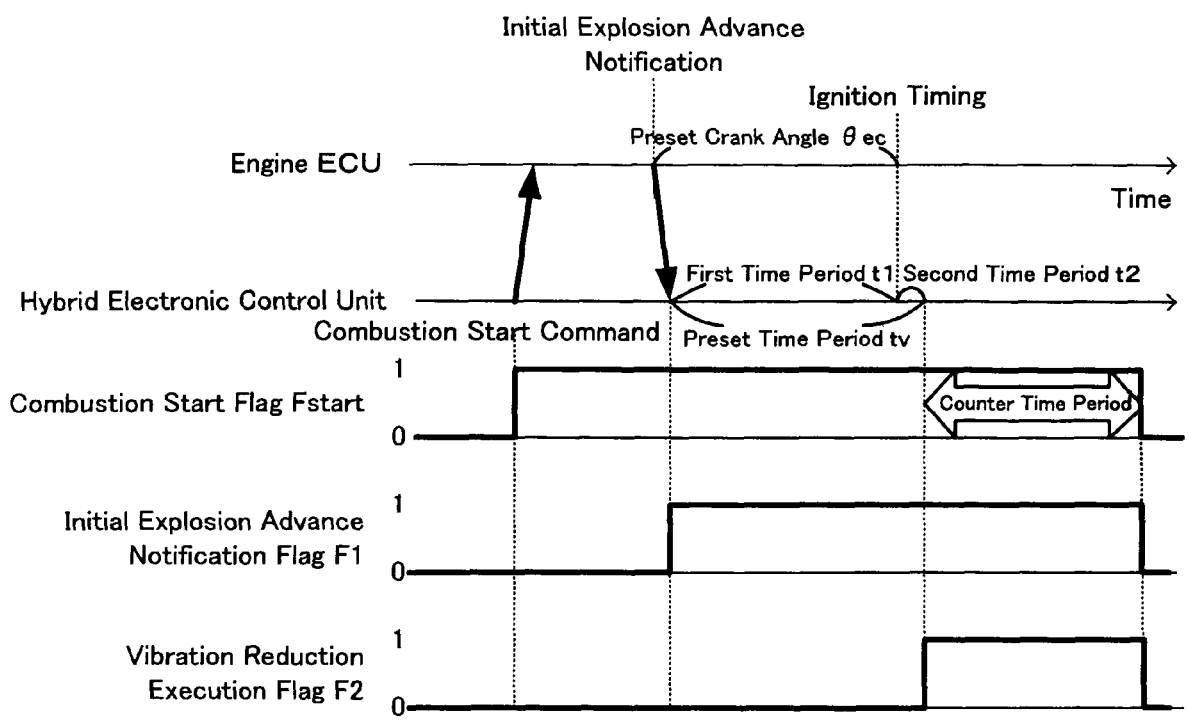
FIG. 10 is a timing chart showing a communication status between the hybrid electronic control unit 70 and the engine ECU 24 and on-off states of respective flags set by the hybrid electronic control unit 70.

The processing status of the hybrid electronic control unit 70 and the engine ECU 24 is described according to the timing chart of FIG. 10. FIG. 10 is the timing chart showing the communication status between the hybrid electronic control unit 70 and the engine ECU 24 and the on-off states of the respective flags set by the hybrid electronic control unit 70. The hybrid electronic control unit 70 sends the combustion start command to the engine ECU 24 and sets the combustion start flag Fstart to 1 when the rotation speed Ne of the engine 22 cranked by the motor MG1 reaches the combustion start rotation speed Nstart. The engine ECU 24 receives the combustion start command and sends the initial explosion advance notification to the hybrid electronic control unit 70 when the crank position of the engine 22 reaches the predetermined initial explosion advance notification position, which is prior to the ignition timing of the initial explosion cylinder by the preset crank angle θec. The hybrid electronic control unit 70 receives the initial explosion advance notification and sets the initial explosion advance notification flag F1 to 1. The engine ECU 24 ignites the air-fuel mixture in the initial explosion cylinder at the time when the crank position of the engine 22 is rotated by the preset crank angle θec after transmission of the initial explosion advance notification. The hybrid electronic control unit 70 sends the torque command Tm2* updated in view of the counter torque Tα to the motor ECU 40 and sets the vibration reduction execution flag F2 to 1 when the preset time period has elapsed since reception of the initial explosion advance notification. This series of control timely reduces the torque effect (including the torque shock and the torque shock-induced vibration) caused by the initial explosion of the engine 22 on the ring gear shaft 32a. The hybrid electronic control unit 70 sends the torque command Tm2* updated in view of the counter torque Tα until elapse of the counter time period with the torque effect caused by the initial explosion on the ring gear shaft 32a. After elapse of the counter time period, the hybrid electronic control unit 70 resets the respective flags Fstart, F1, and F2 and the counter torque Tα to 0. By taking into account a potential time delay between transmission of the torque command Tm2* from the hybrid electronic control unit 70 to the motor ECU 40 and actual output of the torque Tm2 by the motor MG2 corresponding to the torque command Tm2*, the transmission timing of the torque command Tm2* is preferably set to be slightly before actual appearance of the torque effect on the ring gear shaft 32a.

In the hybrid vehicle 20 of the embodiment described above, the engine ECU 24 and the hybrid electronic control unit 70 synchronize their operations via transmission of the initial explosion advance notification as the synchronizing signal. At the initial explosion of the engine 22 driven and controlled by the engine ECU 24, the motor MG2 driven and controlled by the hybrid electronic control unit 70 timely generates the counter torque Tα, in order to cancel out the torque applied to the ring gear shaft 32a or the driveshaft. Such control sufficiently reduces the potential torque shock at the initial explosion of the engine 22. The preset time period tv referred to by the hybrid electronic control unit 70 is set based on the preset crank angle θec in light of the communication delay between the engine ECU 24 and the hybrid electronic control unit 70. This further enhances the accuracy of the timing to reduce the torque effect caused by the initial explosion on the ring gear shaft 32a or the driveshaft.

In the hybrid vehicle 20 of the embodiment, the hybrid electronic control unit 70 sets the vibration reduction execution flag F2 to 1 at the timing when the preset time period tv has elapsed since reception of the initial explosion advance notification. In one possible modification, the vibration reduction execution flag F2 may be set to 1 at the timing when the crankshaft 26 is rotated by a specific crank angle (a time relevant parameter) corresponding to the preset time period tv after reception of the initial explosion advance notification. In this modified structure, the hybrid electronic control unit 70 preferably inputs the crank angle θe of the engine 22 detected by the crank angle sensor 140 not via the engine ECU 24 but directly.

In the hybrid vehicle 20 of the embodiment, the preset time period tv is the sum of the first time period t1 between reception of the initial explosion advance notification and the ignition timing of the initial explosion cylinder in the engine 22 and the second time period t2 between the ignition timing of the initial explosion cylinder in the engine 22 and appearance of torque effect caused by the ignition of the initial explosion cylinder on the ring gear shaft 32a. The time period tv may be determined by additionally considering possible time delays, for example, a time period required for transmission of the torque command Tm2* from the hybrid electronic control unit 70 to the motor ECU 40 and a time period required for output of a torque by the motor MG2 corresponding to the torque command Tm2* given by the motor ECU 40. Namely the hybrid electronic control unit 70 may send the torque command Tm2* to the motor ECU 40 by taking into account these potential time delays, prior to the actual appearance of the torque effect caused by the ignition of the initial explosion cylinder on the ring gear shaft 32a. Such control desirably decreases a time difference between the timing of the appearance of the torque effect caused by the ignition of the initial explosion cylinder on the ring gear shaft 32a and the timing of generation of the counter torque Tα to be applied to the ring gear shaft 32a.

Figure 11:
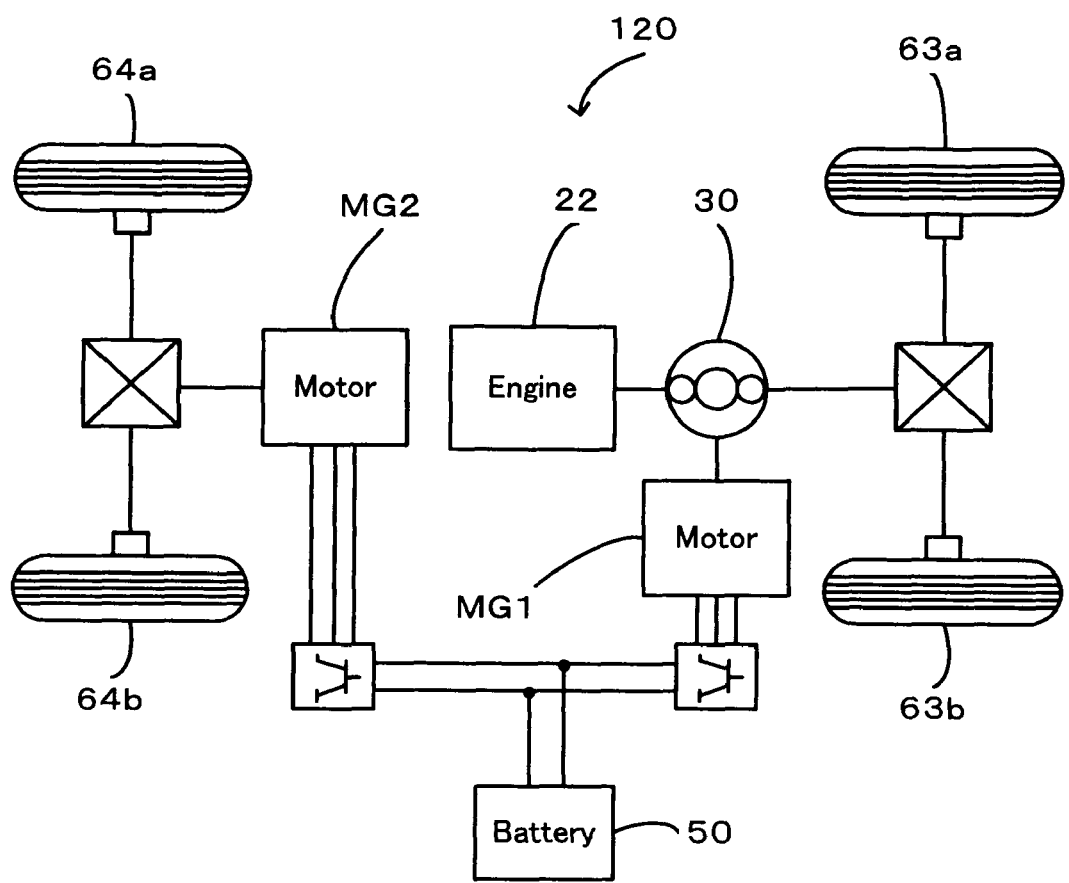
FIG. 11 schematically illustrates the configuration of another hybrid vehicle 120 in one modified example.

In the hybrid vehicle 20 of the embodiment, the power of the motor MG2 is converted by the reduction gear 35 and is output to the ring gear shaft 32a. The technique of the invention may be applicable to a hybrid vehicle 120 of a modified structure shown in FIG. 11. In the hybrid vehicle 120 of FIG. 11, the power of the motor MG2 is connected to another axle (an axle linked with wheels 64a and 64b) that is different from the axle connecting with the ring gear shaft 32a (the axle linked with the drive wheels 63a and 63b). In this structure, the torque effect caused by the initial explosion of the engine 22 is reduced via the road surface.

Figure 12:
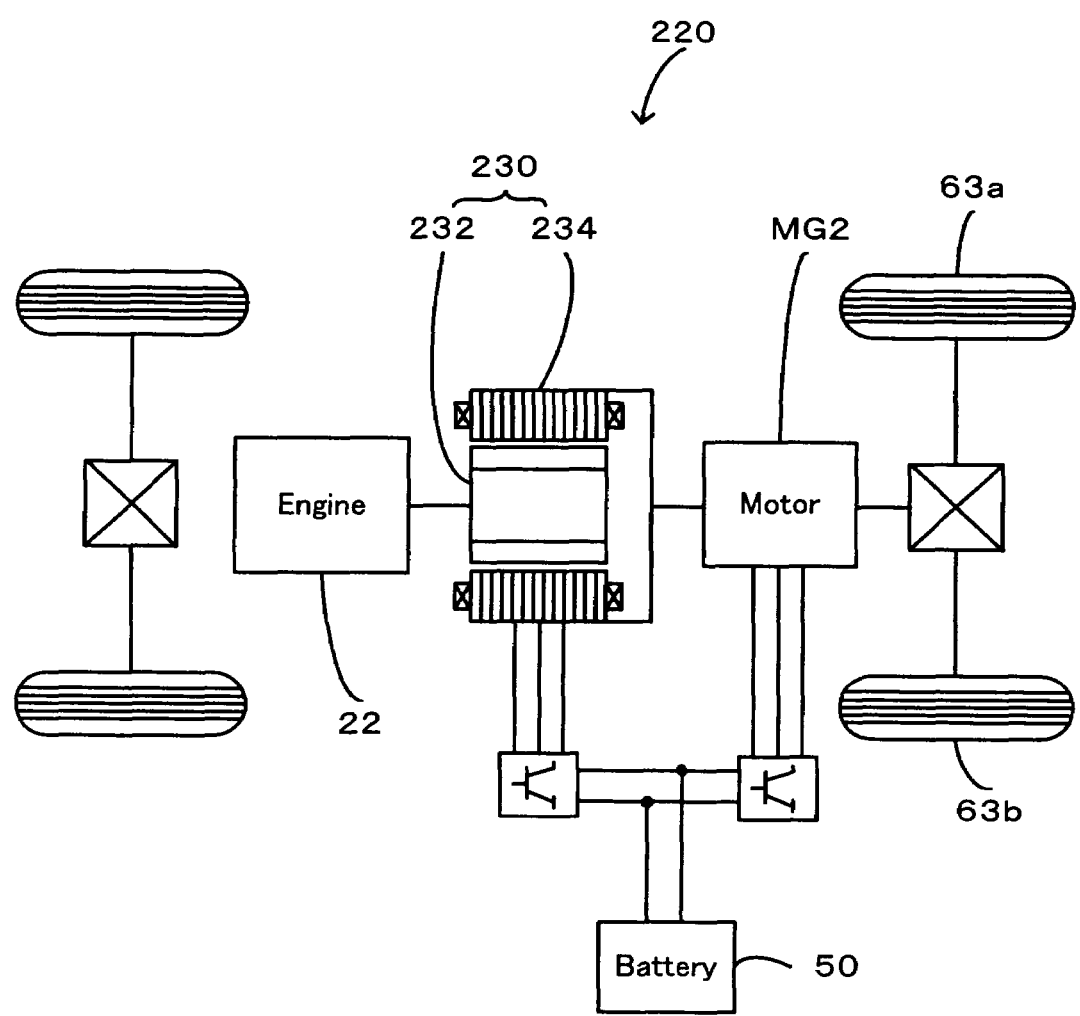
FIG. 12 schematically illustrates the configuration of still another hybrid vehicle 220 in another modified example.

In the hybrid vehicle 20 of the embodiment, the power of the engine 22 is transmitted via the planetary gear mechanism 30 to the ring gear shaft 32a or the driveshaft linked with the drive wheels 63a and 63b. The technique of the invention may also be applicable to a hybrid vehicle 220 of another modified structure shown in FIG. 12. The hybrid vehicle 220 of FIG. 12 is equipped with a pair-rotor motor 230. The pair-rotor motor 230 includes an inner rotor 232 connected to the crankshaft 26 of the engine 22 and an outer rotor 234 connected to a driveshaft for power output to the drive wheels 63a and 63b. The pair-rotor motor 230 transmits part of the output power of the engine 22 to the driveshaft, while converting the residual engine output power into electric power.

The embodiment discussed above is to be considered in all aspects as illustrative and not restrictive. There may be many modifications, changes, and alterations without departing from the scope or spirit of the main characteristics of the present invention.

The present application claims the benefit of priority from Japanese Patent Application No. 2005-365434 filed on Dec. 19, 2005, the entire contents of which are incorporated herein by reference.

INDUSTRIAL APPLICABILITY

The technique of the invention is preferably applied to the auto-related industries including general cars, buses, and trucks, as well as to the transport vehicle-related industries including trains, boats and ships, and aircraft, the heavy equipment-related industries including construction equipment and machinery, and the agricultural machinery-related industries.

The invention claimed is:

1. A power output apparatus that outputs power to a driveshaft, the power output apparatus comprising:
    an internal combustion engine;
    an electric power-mechanical power input output structure that is connected to an output shaft of the internal combustion engine and to the driveshaft and outputs at least part of output power of the internal combustion engine to the driveshaft through input and output of electric power and mechanical power;
    a motor that inputs and outputs power to and from the driveshaft;
    an accumulator unit that transmits electric power from and to the electric power-mechanical power input output structure and the motor;
    a torque demand setting module that sets a torque demand required for the driveshaft in response to an operator's operation;
    an internal combustion engine control module that controls operation of the internal combustion engine; and
    a total control module that, upon satisfaction of a start condition of the internal combustion engine in an operation stop state of the internal combustion engine, drives and controls the electric power-mechanical power input output structure to crank the internal combustion engine, while driving and controlling the motor to cancel out a torque applied to the driveshaft as a reactive force accompanied with cranking of the internal combustion engine,
    when a state of the internal combustion engine reaches a specified combustion start timing by cranking, the total control module sending a start command to the internal combustion control module,
    in response to reception of a synchronizing signal that is sent by the internal combustion engine control module at a specific timing prior to an initial explosion ignition timing by a preset value of a specific time relevant parameter after transmission of the start command, the total control module driving and controlling the motor to output a specific torque that is smaller by a preset torque than a torque demand to be output from the motor when a certain time period corresponding to an equivalent value of the specific time relevant parameter has elapsed since reception of the synchronizing signal.

2. The power output apparatus in accordance with claim 1, wherein the equivalent value of the specific time relevant parameter is set either to the preset value of the specific time relevant parameter or to the preset value in view of at least a communication delay between the internal combustion engine control module and the total control module.

3. The power output apparatus in accordance with claim 1, wherein the specific time relevant parameter is a crank angle of the internal combustion engine that varies with elapse of time.

4. The power output apparatus in accordance with claim 3, wherein both the internal combustion engine control module and the total control module are constructed to enable direct input of the crank angle of the internal combustion engine.

5. The power output apparatus in accordance with claim 1, wherein the electric power-mechanical power input output structure has: a three shaft-type power input output mechanism that is linked to three shafts, the output shaft of the internal combustion engine, the driveshaft, and a third shaft, and inputs and outputs power from and to a residual one shaft based on powers input from and output to any two shafts among the three shafts; and a generator that inputs and outputs power from and to the third shaft.

6. A vehicle that is equipped with the power output apparatus in accordance with claim 1 and has an axle mechanically linked with the driveshaft.

7. A control method of a power output apparatus, where the power output apparatus has: an internal combustion engine; an electric power-mechanical power input output structure that is connected to an output shaft of the internal combustion engine and to a driveshaft and outputs at least part of output power of the internal combustion engine to the driveshaft through input and output of electric power and mechanical power; a motor that inputs and outputs power to and from the driveshaft; an accumulator unit that transmits electric power from and to the electric power-mechanical power input output structure and the motor; a torque demand setting module that sets a torque demand required for the driveshaft in response to an operator's operation; and an internal combustion engine control module that controls operation of the internal combustion engine, (a) upon satisfaction of a start condition of the internal combustion engine in an operation stop state of the internal combustion engine, the control method driving and controlling the electric power-mechanical power input output structure to crank the internal combustion engine, while driving and controlling the motor to cancel out a torque applied to the driveshaft as a reactive force accompanied with cranking of the internal combustion engine;

(b) when a state of the internal combustion engine reaches a specified combustion start timing by cranking, the control method sending a start command to the internal combustion control module; and (c) in response to reception of a synchronizing signal that is sent by the internal combustion engine control module at a specific timing prior to an initial explosion ignition timing by a preset value of a specific time relevant parameter after transmission of the start command, the control method driving and controlling the motor to output a specific torque that is smaller by a preset torque than a torque demand to be output from the motor when a certain time period corresponding to an equivalent value of the specific time relevant parameter has elapsed since reception of the synchronizing signal.

* * * * *